(12) United States Patent
Eulette et al.

(10) Patent No.: US 7,150,247 B2
(45) Date of Patent: Dec. 19, 2006

(54) WEARABLE RETRACTING ANIMAL LEASH

(75) Inventors: Charlotte Eulette, 93 Valley Rd., Montclair, NJ (US) 07042; Mark Attalla, 93 Valley Rd., Montclair, NJ (US) 07042; Michael Leone, Rockaway, NJ (US)

(73) Assignees: Charlotte Eulette, Montclair, NJ (US); Mark Attalla, Montclair, NJ (US)

( * ) Notice: Subject to any disclaimer, the term of this patent is extended or adjusted under 35 U.S.C. 154(b) by 0 days.

(21) Appl. No.: 10/943,080

(22) Filed: Sep. 16, 2004

(65) Prior Publication Data

US 2006/0054108 A1 Mar. 16, 2006

(51) Int. Cl.
*A01K 27/00* (2006.01)

(52) U.S. Cl. ...................... 119/798; 119/796

(58) Field of Classification Search ................ 119/796, 119/797, 798; D30/152, 153, 137; D22/137, D22/140; 242/223, 243, 310, 382, 398
See application file for complete search history.

(56) References Cited

U.S. PATENT DOCUMENTS

| | | | |
|---|---|---|---|
| 3,198,175 A * | 8/1965 | Dean | ............................ 119/796 |
| 4,018,189 A | 4/1977 | Umphries et al. | |
| 4,088,276 A * | 5/1978 | Littleton | ....................... 242/398 |
| 4,197,817 A | 4/1980 | Crutchfield | |
| 4,269,150 A * | 5/1981 | McCarthy | .................... 119/796 |
| 4,328,766 A | 5/1982 | Deibert | |
| 4,578,867 A * | 4/1986 | Czerwinski et al. | ......... 242/398 |
| 4,964,370 A | 10/1990 | Peterson | |
| 4,977,860 A | 12/1990 | Harwell | |
| 5,233,942 A | 8/1993 | Cooper et al. | |
| 5,423,494 A | 6/1995 | Kondo | |
| 5,816,198 A | 10/1998 | Peterson | |
| 6,581,547 B1 * | 6/2003 | Austin | ......................... 119/796 |
| D484,650 S * | 12/2003 | Meath | ........................ D30/153 |
| 6,845,736 B1 * | 1/2005 | Anderson | .................... 119/796 |
| 6,912,975 B1 * | 7/2005 | Balan | .......................... 119/796 |

* cited by examiner

*Primary Examiner*—Teri Pham Luu
*Assistant Examiner*—Elizabeth Shaw
(74) *Attorney, Agent, or Firm*—Schiff Hardin LLP

(57) ABSTRACT

A retractable dog leash system is designed to attach to the collar of a pet and be permanently worn in this manner is small and lightweight, and comprises an ergonomic handle that fits neatly against the case when the leash is in a retracted condition. Advantageously, the leash system comprises a leash retraction biasing mechanism that is free on one end permitting an unwinding of the biasing mechanism and not merely a tightening of it.

16 Claims, 3 Drawing Sheets

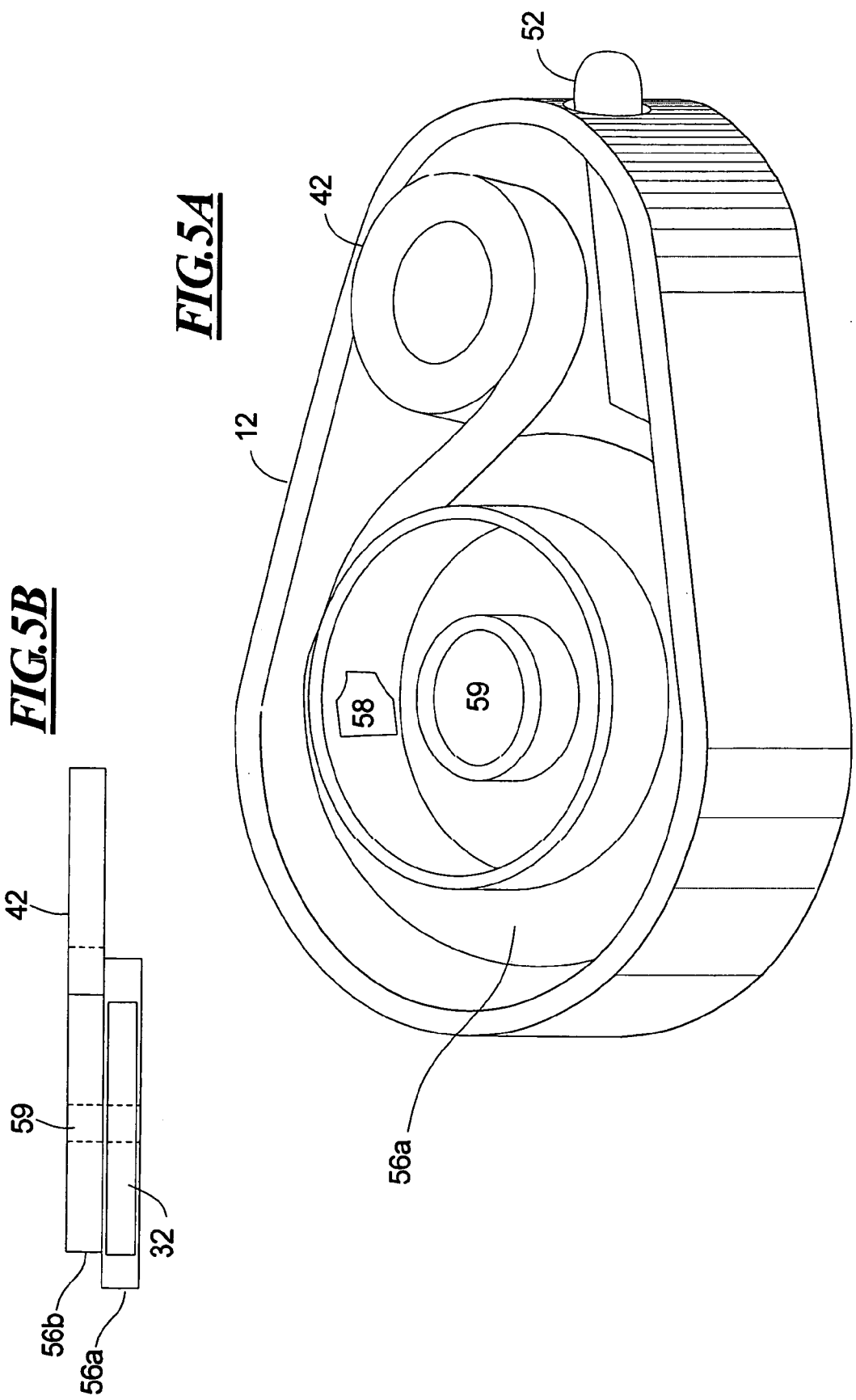

WEARABLE RETRACTING ANIMAL LEASH

BACKGROUND OF THE INVENTION

The invention is directed to a pet leash system that is designed to be worn on the collar of a pet.

Such systems are known from, e.g., U.S. Pat. No. 4,328,766 which discloses a retractable leash that is barrel shaped and has leaf spring that is coaxial with a spool upon which the leash is wound, as well as a ring to which an additional leash or handle may be affixed.

U.S. Pat. No. 4,018,189 shows a similar design that has a bar-style handle attached to the leash. This is also disclosed by U.S. Pat. No. 4,197,817 where the bar-style handle is segmented into three sections that may be straightened when the collar is in use. Related designs can be found in U.S. Pat. Nos. 4,964,370 and 4,977,860.

All of these systems utilize either no affixed handle or else have an affixed handle that is not ergonomic or does not mate cleanly with the case in a small and lightweight manner. Furthermore, all of these systems use a bias spring that is rigidly fixed at its center point end that only permit a tightening of the spring of the spring when the leash is extended.

SUMMARY OF THE INVENTION

An object of the present invention is to provide an attachable leash to an animal collar that is small, lightweight, and has a low profile so that it may be worn by the animal without discomfort due to weight and bulkiness, and that has an ergonomic handle.

The object of the invention is achieved by an extendable pet leash system configured to be worn on a pet collar, comprising: a case; an attachment mechanism that is affixed to the case and is configured to attach the leash system to a pet collar; a grip handle configured to mount on an exterior portion of the case; a leash attached to the grip handle; a leash spool having the leash coiled about it in a retracted state and comprising a spool spindle about which it rotates; a thin coil negator spring that is not fixed on one end and is free to rotate, and affixed on an other end to the leash spool, the negator spring configured to provide a rotational bias to the leash spool in a leash retraction direction; a stop mechanism configured to permit the leash to be extended, but preventing the leash from retracting based on the bias of the negator spring; and a stop release mechanism configured to disengage the stop mechanism and permit the lease to be retracted.

This object is also achieved by an extendable pet leash system configured to be worn on a pet collar, comprising: a case; an attachment mechanism that is affixed to the case and is configured to attach the leash system to a pet collar; a grip handle configured to mount on an exterior portion of the case having an outer portion that roughly approximates a case curvature, and an inner portion that has at least one grip curve configured to mate with a matching curve of the case thereby creating a gapless mating surface between the inner portion of the grip handle and the case when the leash is in a retracted position; a leash attached to the grip handle; a leash spool having the leash coiled about it in a retracted state and comprising a spool spindle about which it rotates; a retracting bias mechanism configured to provide a retracting bias to the leash spool; a stop mechanism configured to permit the leash to be extended, but preventing the leash from retracting based on the bias of the retracting bias mechanism; and a stop release mechanism configured to disengage the stop mechanism and permit the lease to be retracted.

DESCRIPTION OF THE DRAWINGS

The following drawing figures illustrate various embodiments of the invention that are described below.

FIG. 5a is a pictorial isometric view of the spring and leash spool; and

FIG. 5b is a side view of the spring and leash spool.

DETAILED DESCRIPTION OF THE PREFERRED EMBODIMENTS

Figure 1:
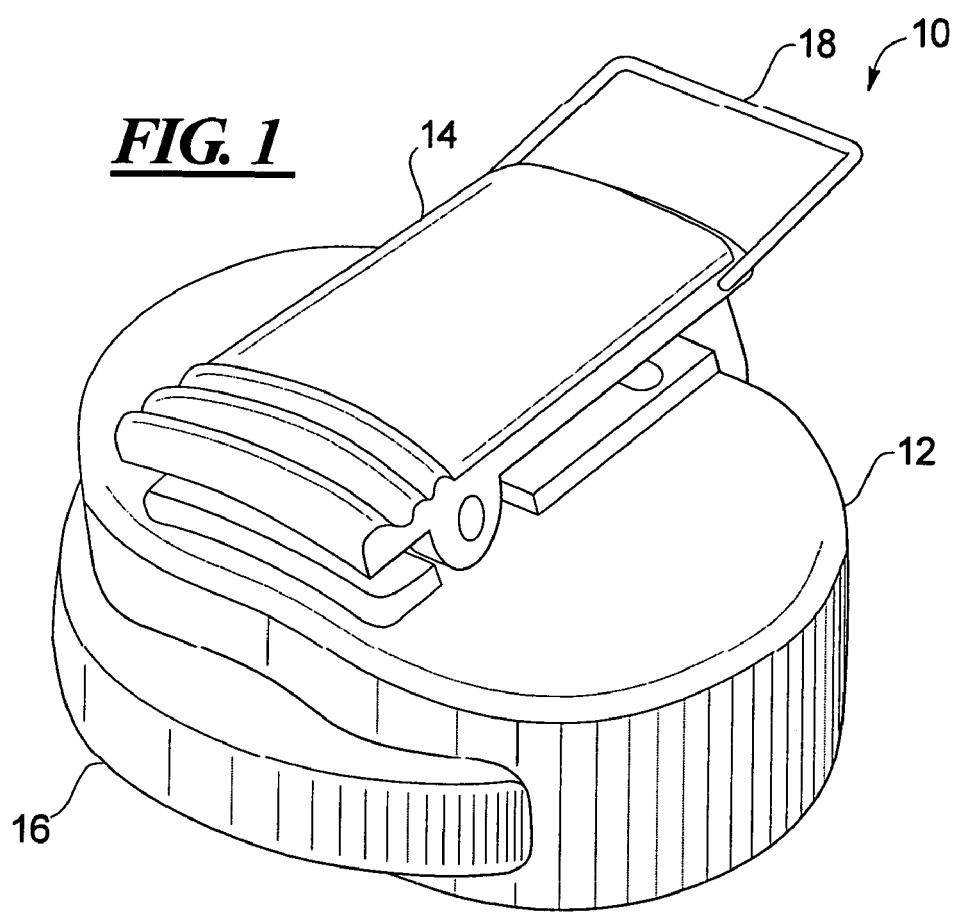
FIG. 1 is a pictorial isometric view of the pet leash system.

Various embodiments of the invention are discussed in more detail below. FIG. 1 illustrates an embodiment of the basic pet leash system 10 with a plastic case 12 that surrounds the internal mechanisms, a clip 14 with clip ring 18 for attaching the leash system 10 to the collar of an animal, and a grip handle 16 that is advantageously configured, when the leash is completely retracted, to mate with and approximately conform to the shape of the case 12. An outer curve of the grip handle 16 is only slightly more severe than the curve of the case 12, and the ends of the grip handle 16 are designed to be flush with the case 12 so that no significant gaps are created between the grip handle 16 and case 12 when the leash is retracted. Since the leash system 10 is designed so that it can be worn by the pet at all times, this design feature prevents the leash system 10 from getting caught on various object that a pet is likely to encounter.

Although various sizes of the leash are possible, an ideal version of the leash has dimensions of approximately 2"×3"×1.5", which can permit a leash length of around 44".

Figure 2:
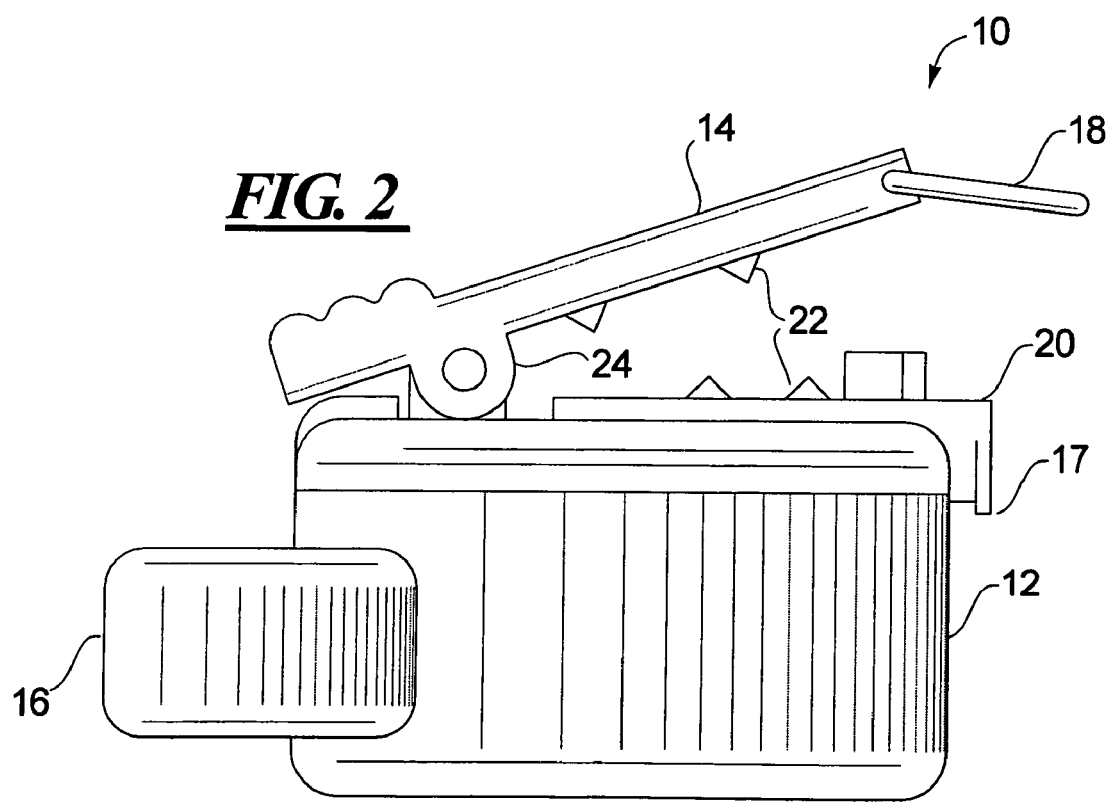
FIG. 2 is a pictorial side view showing the clip in an open position.

FIG. 2 illustrates the mechanism for attaching the leash system 10 to a pet collar (not shown). A clip 14 is attached to the case 12 by way of, e.g., a shaft mounted to the case 12 at a clip pivot point 24. The clip in this configuration may be biased to close towards the case with a cylindrical spring attached with known methods. Other known biasing mechanisms are possible as well for the clip 14. It is not necessary to bias the clip 14 towards the case 12, since a clip ring 18 is provided that can be used with a clip holder 17 to keep the clip 14 in a closed position once it is mounted to the pet collar. Clip grip protrusions 22 may be further utilized to secure the grip on the leash. In a preferred embodiment, the grip protrusions 22 may have a circular cross-section and be pointed on one end to grip the leash and prevent its movement around, although other configurations that inhibit leash movement are considered as encompassed by the invention.

Figure 3:
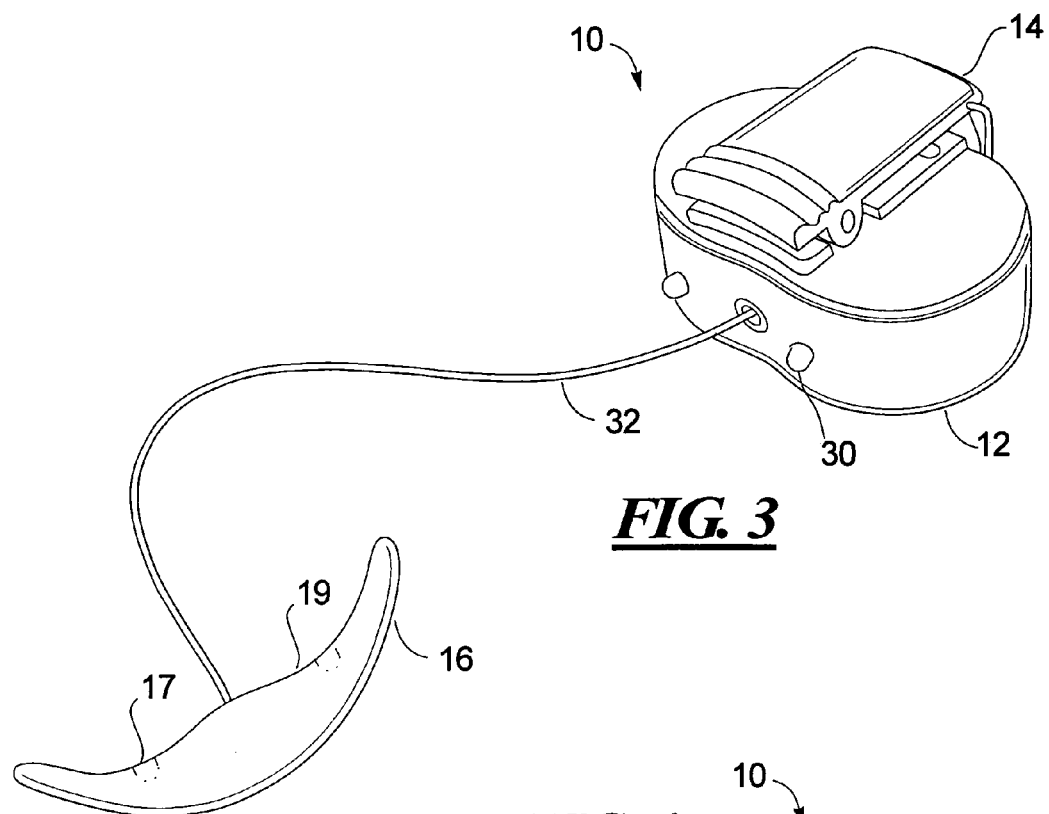
FIG. 3 is a pictorial isometric view showing the leash extended.

FIG. 3 illustrates the leash system 10 with the leash 32 extended. The leash 32 is made of a material that is resilient and difficult to break. It is not abrasive when in contact with a hand or pet, and is very thin. In an embodiment of the invention, the grip handle 16 to which the leash 32 is attached, has curved portions 19 that ideally can be used to hold the leash with two fingers. These curves 19 can also partially define the shape of the case 12 at the mating portion between the grip handle 16 and case 12.

Additionally, it is possible to include a placement and alignment mechanism to keep the grip handle 16 at a particular position with respect to the case 12 when it is retracted. FIG. 3 illustrates the use of two grip alignment protrusions 30 configured to mate with two grip alignment holes 17 in the grip handle 16. However, other mechanisms (slots, grooves, indented portions, etc.) could also easily be used to maintain the position of a retracted grip handle 16 to the case.

Figure 4:
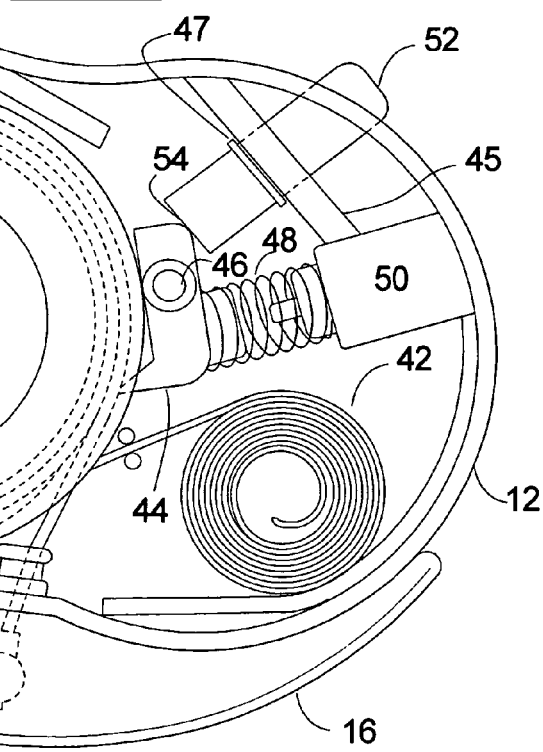
FIG. 4 is a cross-section top view of the interior of the pet leash system.

FIG. 4 illustrates the inner workings of the leash system 10. The leash 32 is wound around a leash spool 56 that is affixed to the case 12 via a spool spindle 59 around which the spool 56 can rotate. A thin coil negator spring 42 designed as a clock spring has an inner end that is not rigidly affixed and is free to rotate around as the spring 42 is unwound while extending the leash 32. The negator spring 42 may simply utilize the case 12 and internal mechanisms to bound the negator spring on its outer periphery and possibly guides to assist positioning the spring. Alternately, some mechanism may be provided within a central portion of the negator spring 42 to keep the spring in position, provided the inner end of the spring 42 is not affixed to this mechanism and permits the spring 42 to rotate freely.

In an advantageous embodiment, this spring 42 can be almost entirely unwound when the leash 32 is fully extended (e.g., with only 1.5 turns remaining)—advantageously, this free end that allows the spring to be unwound provides a significantly greater degree of leash 32 extension than systems in which the biasing spring is rigidly fixed/mounted at its center and simply tightens in response to a leash extension. This permits a much longer leash to be used while at the same time helping to minimize the size of the case.

The spring 42 has a recoil memory that is configured to provide a bias on the leash spool 56 in a retracting or winding direction. In order to prevent a constant pulling force on the extended leash 32, a stopping mechanism may be provided. One possible embodiment of such a stopping mechanism can be seen in FIG. 4 comprising a pointed stop 44 mounted on a stop pivot 46. The pointed portion of the stop 44 is angled such that the point digs into the material on some portion of the leash spool 56 when the spool is being turned in a direction to retract the leash 32, thereby preventing further rotational motion of the spool 56, but so that the point simply drags along on the leash spool 56 when it is rotating in a direction to extend the leash 32, thereby permitting motion in this direction. Instead of (or possibly in addition to) the point digging into the material, an appropriately shaped set of teeth (e.g., ramp-step) could be used on the spool 56 to accomplish the same purpose.

A force is applied on the stop 44 to drive it into the leash spool 56 by a stop spring 48 affixed to an end of the stop 44 having the point. An opposite end of the stop spring 48 is attached to a stop spring biasing mechanism 50 and may possibly utilize stop spring posts that allow a snug it of the stop spring 48 and keep it generally in position. The embodiment shown in FIG. 4 utilizes a spring in compression on the point end of the stop 44. However, a spring in tension could just as easily be used on an end opposite the point.

The stop 44 may be released permitting retraction of the leash 32 by, e.g., a retractor button 52 that extends outside of the case. When the retractor button 52 is pressed by a user, it causes the stop 44 to rotate about the pivot point 46 via a force at a stop release contact point 54 such that the point disengages from the leash spool 56. The retractor button may be guided and positioned by use of a guide 45 affixed to the case 12 in conjunction with a parallel hole in the case through which the retractor button 52 extends. A retaining ring 47 may further be provided to prevent the retractor button 52 from traveling too far.

FIGS. 5A and 5B show in more detail the association of the thin coil negator spring 42 with the leash spool 56. The leash spool has two portions: the leash portion 56a around which the leash 32 is wound, and the spring portion 56b around which a take-up portion of the spring 42 winds when the leash 32 is extended. The spring 42 is affixed to the spring portion 56b at a spring joining section 58.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The particular implementations shown and described herein are illustrative examples of the invention and are not intended to otherwise limit the scope of the invention in any way. For the sake of brevity, conventional aspects of the system (and components of the individual operating components of the system) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

LIST OF REFERENCE CHARACTERS

10 pet leash system
12 case
14 clip
16 grip handle
17 clip holder
18 clip ring
19 grip curves
20 clip mating portion
22 clip grip protrusions with potentially pointed ends
24 clip pivot
30 grip alignment protrusions
32 leash
42 thin coil negator spring
44 stop mechanism
45 button guide
46 stop pivot
47 retaining ring
48 stop spring
50 stop spring bias mechanism
52 retractor button
54 stop release contact point
56 leash spool
56a leash portion
56b spring portion
58 spring joining section
59 spool spindle

What is claimed is:

1. An extendable pet leash system configured to be worn on a pet collar, comprising:

a case selectively attachable to the pet collar;

an attachment mechanism that is affixed to the case and is configured to selectively attach and selectively detach the leash system to a pet collar;

a grip handle configured to mount on an exterior portion of the case;

a leash attached to the grip handle;

a leash spool having the leash coiled about it in a retracted state and comprising a spool spindle about which it rotates;

a thin coil negator spring that is free on one end to rotate and affixed on an other end to the leash spool, the negator spring configured to provide a rotational bias to the leash spool in a leash retraction direction;

a stop mechanism that when engaged prevents retraction of the leash and when engaged permits the leash to be extended; and a stop release mechanism configured to disengage the stop mechanism and permit the leash to be retracted, the stop release mechanism being located at the case and remote from the grip handle.

2. The leash system according to claim 1, wherein the attachment mechanism is a clip.

3. The leash system according to claim 2, wherein the clip further comprises a clip ring configured to attach to a clip holder mounted on the case to secure the clip in a closed position.

4. The leash system according to claim 2, wherein the clip and case comprise clip grip protrusions configured to grip the pet collar when the clip is in a closed position.

5. The leash system according to claim 1, wherein the stop mechanism has a pointed end or corner configured to engage the leash spool.

6. The leash system according to claim 5, wherein the leash spool is made of a relatively soft material so that the stop mechanism pointed end or corner can hold the leash spool against the bias of the negator spring.

7. The leash system according to claim 5, wherein the leash spool comprises teeth that engage the pointed end or corner of the stop mechanism.

8. The leash system according to claim 5, wherein the stop release mechanism comprises a button that is external to the case, and is configured to press against an end of the stop mechanism at an end opposite the pointed end or corner and on the other side of a stop pivot, configured such that when the button is pressed, the stop mechanism is disengaged from holding the leash spool.

9. The leash system according to claim 5, further comprising a stop spring configured to bias the pointed end or corner against the leash spool.

10. The leash system according to claim 9, wherein the stop spring is a compression spring.

11. An extendable pet leash system configured to be worn on a pet collar, comprising:

a case;

an attachment mechanism that is affixed to the case and is configured to attach the leash system to a pet collar;

a grip handle configured to mount on an exterior portion of the case;

a leash attached to the grip handle;

a leash spool having the leash coiled about it in a retracted state and comprising a spool spindle about which it rotates;

a thin coil negator spring that is free on one end to rotate and affixed on an other end to the leash spool, the negator spring configured to provide a rotational bias to the leash spool in a leash retraction direction;

a stop mechanism configured to permit the leash to be extended, but preventing the leash from retracting based on the bias of the negator spring;

a stop release mechanism configured to disengage the stop mechanism and permit the leash to be retracted;

wherein the attachment mechanism is a clip; and wherein the clip comprises a pivot about which the clip rotates.

12. An extendable pet leash system configured to be worn on a pet collar, comprising:

a case selectively attachable to the pet collar;

an attachment mechanism that is affixed to the case and is configured to selectively attach and selectively detach the leash system to a pet collar;

a grip handle configured to mount on an exterior portion of the case having an outer portion that roughly approximates a case curvature, and an inner portion that has at least one grip curve configured to mate with a matching curve of the case thereby creating a gapless mating surface between the inner portion of the grip handle and the case when the leash is in a retracted position;

a leash attached to the grip handle;

a leash spool having the leash coiled about it in a retracted state and comprising a spool spindle about which it rotates;

a retracting bias mechanism configured to provide a retracting bias to the leash spool;

a stop mechanism that when engaged prevents retraction of the leash and when engaged permits the leash to be extended; and a stop release mechanism configured to disengage the stop mechanism and permit the leash to be retracted, the stop release mechanism being located at the case and remote from the grip handle.

13. The leash system according to claim 12, wherein the grip handle inner portion has two or more curves.

14. An extendable pet leash system configured to be worn on a pet collar, comprising:

a case;

an attachment mechanism that is affixed to the case and is configured to attach the leash system to a pet collar;

a grip handle configured to mount on an exterior portion of the case having an outer portion that roughly approximates a case curvature, and an inner portion that has at least one grip curve configured to mate with a matching curve of the case thereby creating a gapless mating surface between the inner portion of the grip handle and the case when the leash is in a retracted position;

a leash attached to the grip handle;

a leash spool having the leash coiled about it in a retracted state and comprising a spool spindle about which it rotates;

a retracting bias mechanism configured to provide a retracting bias to the leash spool;

a stop mechanism configured to permit the leash to be extended, but preventing the leash from retracting based on the bias of the retracting bias mechanism;

a stop release mechanism configured to disengage the stop mechanism and permit the lease to be retracted; and wherein the case comprises a grip handle alignment mechanism, and the grip handle comprises a mating portion to hold the grip handle in alignment with the case when the leash is retracted.

15. The leash system according to claim 14, wherein the alignment mechanism on the case comprises two or more protrusions; and the mating portion of the grip handle comprises mating holes configured to accept the protrusions and maintain alignment.

16. The leash system according to claim 14, wherein the leash system is configured to fit within a box having the dimensions of 2"×3"×1.5" when the leash is in a retracted state.

* * * * *